United States Patent
Harris et al.

(10) Patent No.: US 12,175,251 B2
(45) Date of Patent: Dec. 24, 2024

(54) COMPRESSION OF ENTRIES IN A REORDER BUFFER

(71) Applicant: Arm Limited, Cambridge (GB)

(72) Inventors: Glen Andrew Harris, Austin, TX (US); Alexander Cole Shulyak, Austin, TX (US); . Abhishek Raja, Niagara Falls, NY (US); Bipin Prasad Heremagalur Ramaprasad, Austin, TX (US); William Elton Burky, Austin, TX (US); Li Ma, Austin, TX (US); Michael David Achenbach, Austin, TX (US); Nicholas Andrew Plante, Austin, TX (US); Yasuo Ishii, Austin, TX (US)

(73) Assignee: Arm Limited, Cambridge (GB)

( * ) Notice: Subject to any disclaimer, the term of this patent is extended or adjusted under 35 U.S.C. 154(b) by 113 days.

(21) Appl. No.: 18/107,139

(22) Filed: Feb. 8, 2023

(65) Prior Publication Data

US 2024/0264841 A1 Aug. 8, 2024

(51) Int. Cl.
*G06F 9/38* (2018.01)
(52) U.S. Cl.
CPC .......... *G06F 9/3856* (2023.08); *G06F 9/3861* (2013.01)
(58) Field of Classification Search
None
See application file for complete search history.

(56) References Cited

U.S. PATENT DOCUMENTS 9,626,249 B1 4/2017 Bushman et al.
10,445,094 B2 * 10/2019 Beard .................... G06F 9/3005
(Continued)

FOREIGN PATENT DOCUMENTS

JP 2021-82261 5/2021
WO WO-2017203195 A1 * 11/2017 .......... G06F 12/0811

OTHER PUBLICATIONS

'ARM1156T2F-S, Revision: r0p4, Technical Reference Manual' Copyright 2005-2007 ARM Limited. (Year: 2007).*
(Continued)

*Primary Examiner* — Steven G Snyder
(74) *Attorney, Agent, or Firm* — NIXON & VANDERHYE P.C.

(57) ABSTRACT

There is provided an apparatus, method and medium. The apparatus comprises processing circuitry to process instructions and a reorder buffer identifying a plurality of entries having state information associated with execution of one or more of the instructions. The apparatus comprises allocation circuitry to allocate entries in the reorder buffer, and to allocate at least one compressed entry corresponding to a plurality of the instructions. The apparatus comprises memory access circuitry responsive to an address associated with a memory access instruction corresponding to access-sensitive memory and the memory access instruction corresponding to the compressed entry, to trigger a reallocation procedure comprising flushing the memory access instruction and triggering reallocation of the memory access instruction without the compression. The allocation circuitry is responsive to a frequency of occurrence of memory access instructions addressing the access-sensitive memory meeting a predetermined condition, to suppress the compression whilst the predetermined condition is met.

16 Claims, 6 Drawing Sheets

(56) References Cited

U.S. PATENT DOCUMENTS

| | | | |
|---|---|---|---|
| 11,113,783 B2* | 9/2021 | Appu | G06T 1/20 |
| 11,574,382 B2* | 2/2023 | Appu | G06F 9/3818 |
| 11,914,511 B2* | 2/2024 | Spadini | G06F 9/30043 |
| 2013/0111181 A1* | 5/2013 | Kothamasu | G06F 12/0284 |
| | | | 711/202 |
| 2017/0344367 A1* | 11/2017 | Beard | G06F 9/32 |
| 2021/0142438 A1* | 5/2021 | Appu | G06F 9/3818 |
| 2021/0397555 A1* | 12/2021 | Spadini | G06F 9/30043 |
| 2022/0058765 A1* | 2/2022 | Appu | G06F 9/3818 |

OTHER PUBLICATIONS

'Building a Large Instruction Window Through ROB Compression' by Fernando Latorre et al., MEDEA '07, Sep. 16, 2007. (Year: 2007).*

Search Report for GB Application No. 2319108.3 dated Jun. 20, 2024, 4 pages.

* cited by examiner

COMPRESSION OF ENTRIES IN A REORDER BUFFER

TECHNICAL FIELD

The present invention relates to data processing. More particularly the present invention relates to an apparatus, a method and a non-transitory computer readable storage medium to store computer-readable code for fabrication of an apparatus.

BACKGROUND

Some apparatuses for data processing are provided with reorder buffers to store state information associated with execution of instructions. Such state information may be provided in an entry for a single instruction or in a compressed entry that is associated with a plurality of instructions. Compression of entries of the reorder buffer allows a greater number of instructions to be executed out-of-order. However, by allocating a compressed entry it is not necessarily possible to determine the state of execution associated with each instruction included in the compressed entry.

SUMMARY

In some example configurations there is provided an apparatus comprising:
  processing circuitry configured to process a sequence of instructions;
  a reorder buffer identifying a plurality of entries each identifying state information associated with execution of one or more instructions of the sequence of instructions;
  allocation circuitry configured to allocate entries in the reorder buffer based on the sequence of instructions, wherein the allocation circuitry is configured to apply compression to the sequence of instructions to allocate at least one compressed entry corresponding to a plurality of instructions of the sequence of instructions; and
  memory access circuitry responsive to a determination that an address associated with a memory access instruction corresponds to access-sensitive memory and that the memory access instruction corresponds to the compressed entry, to trigger a reallocation procedure comprising flushing the memory access instruction from the processing circuitry and triggering the allocation circuitry to reallocate the memory access instruction without applying the compression,
  wherein the allocation circuitry is responsive to a determination that a frequency of occurrence of memory access instructions addressing the access-sensitive memory meets a predetermined condition, to suppress the compression whilst the predetermined condition is met.

In some example configurations there is provided a method of operating an apparatus, the method comprising:
  processing a sequence of instructions;
  identifying, in a reorder buffer, a plurality of entries each identifying state information associated with execution of one or more instructions of the sequence of instructions;
  allocating entries in the reorder buffer based on the sequence of instructions, wherein the allocation comprises applying compression to the sequence of instructions to allocate at least one compressed entry corresponding to a plurality of instructions of the sequence of instructions;
  in response to a determination that an address associated with a memory access instruction corresponds to access-sensitive memory and that the memory access instruction corresponds to the compressed entry, triggering a reallocation procedure comprising flushing the memory access instruction from the processing circuitry and triggering the allocation circuitry to reallocate the memory access instruction without applying the compression; and
  in response to a determination that a frequency of occurrence of memory access instructions addressing the access-sensitive memory meets a predetermined condition, suppressing the compression whilst the predetermined condition is met.

In some example configurations there is provided a non-transitory computer readable storage medium to store computer-readable code for fabrication of an apparatus comprising:
  processing circuitry configured to process a sequence of instructions;
  reorder buffer identifying a plurality of entries each identifying state information associated with execution of one or more instructions of the sequence of instructions;
  allocation circuitry configured to allocate entries in the reorder buffer based on the sequence of instructions, wherein the allocation circuitry is configured to apply compression to the sequence of instructions to allocate at least one compressed entry corresponding to a plurality of instructions of the sequence of instructions; and
  memory access circuitry responsive to a determination that an address associated with a memory access instruction corresponds to access-sensitive memory and that the memory access instruction corresponds to the compressed entry, to trigger a reallocation procedure comprising flushing the memory access instruction from the processing circuitry and triggering the allocation circuitry to reallocate the memory access instruction without applying the compression,
  wherein the allocation circuitry is responsive to a determination that a frequency of occurrence of memory access instructions addressing the access-sensitive memory meets a predetermined condition, to suppress the compression whilst the predetermined condition is met.

BRIEF DESCRIPTION OF THE DRAWINGS

The present invention will be described further, by way of example only, with reference to configurations thereof as illustrated in the accompanying drawings, in which.

Figure 1:
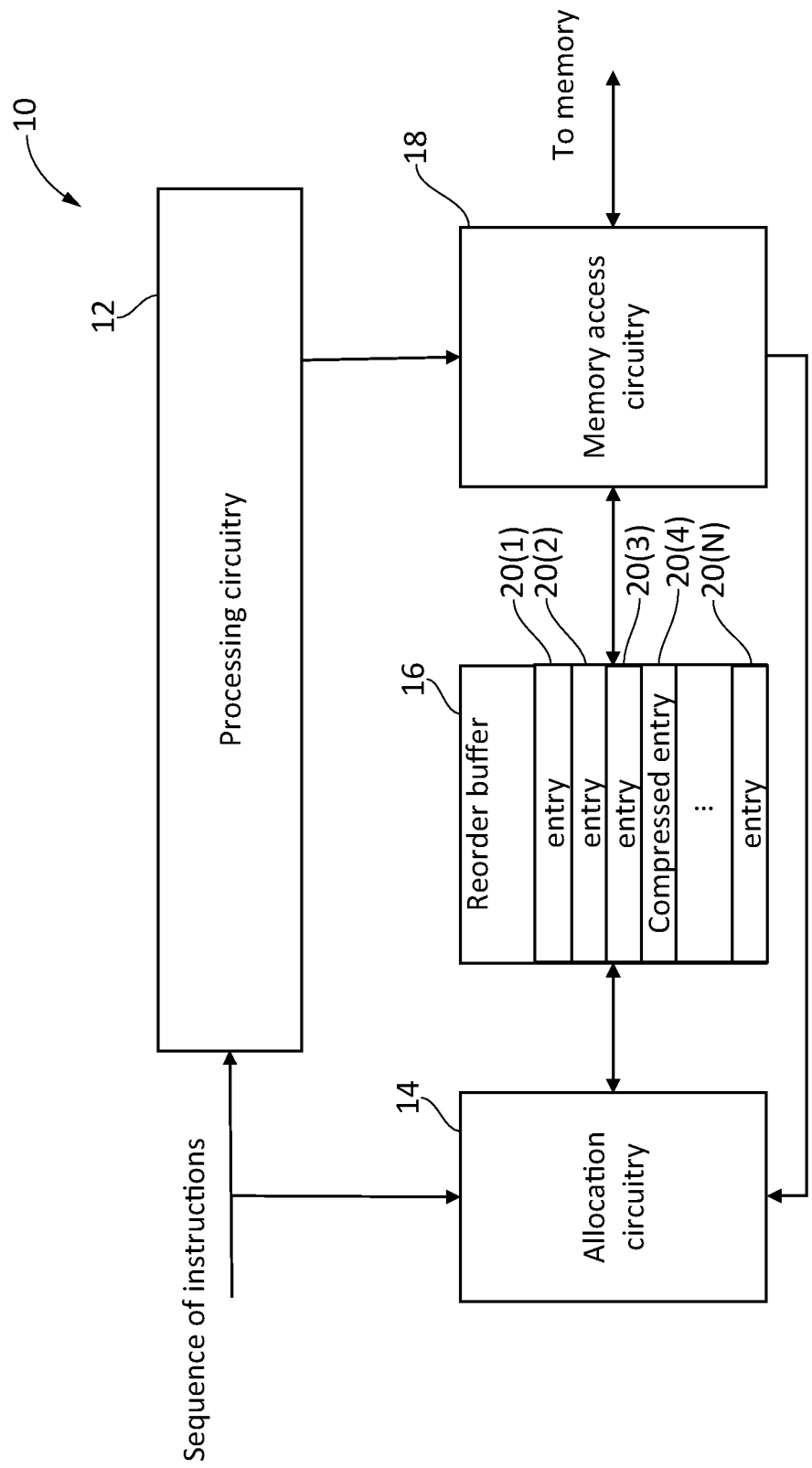
FIG. 1 schematically illustrates an apparatus according to various examples of the present techniques.

DESCRIPTION OF EXAMPLE
CONFIGURATIONS

Before discussing the configurations with reference to the accompanying figures, the following description of configurations is provided.

Some processing apparatuses are able to operate out-of-order where instructions (or micro-operations) are not executed in strict program counter order. In order to facilitate this type of operation, out-of-order processing apparatuses are provided with a reorder buffer that tracks completion of instructions that have been executed out-of-order, stores state information associated with the completed instructions, and determines when the completed instructions are ready to commit in program counter order. In the event of a fault or exception during execution, the state information that is stored in the reorder buffer can be used to ensure that the architectural state during exception handling is the one associated with the faulting instruction regardless of when, relative to other instructions in program counter order, that instruction was issued for execution. This can be achieved, for example, by storing fault information associated with the faulting instruction and waiting for all older instructions (in program counter order) to commit, thereby ensuring that the committed architectural state is the correct one for the faulting instruction. The faulting instruction and any younger instructions can then be flushed and a fault handling routine associated with the faulting instruction can be triggered.

The number of instructions for which state information can be stored and, hence, the number of instructions that could potentially be executed out-of-order, is therefore limited by the size of the reorder buffer. In order to increase the number of instructions that can be executed out-of-order, some apparatuses support the inclusion of compressed entries in the reorder buffer. Such compressed entries associate state information with a plurality of instructions which are then committed or flushed as a single entry. During normal operation of the processing apparatus, the use of compressed entries enables a larger number of instructions to be executed out-of-order. However, in the event of a fault or exception during execution, the compression of entries means that it is not generally possible to determine the architectural state that is associated with the faulting instruction from the reorder buffer.

In the event of a fault or exception, the compressed entry is generally flushed and the instructions are each reissued without any compression being applied. Whilst flushing and reissuing instructions in this way may result in a reduced computational efficiency, in general it does not affect the architectural compliance of the apparatus. One exception to this is where access sensitive memory (device memory) is accessed by one or more of the instructions that are compressed within the compressed entry. Access sensitive memory is memory which is sensitive to an access such that, for example, a subsequent access to a same location in the access sensitive memory may return a different result. For example, access sensitive memory could be implemented in which an access determines a specific data element (or specific data elements) to be returned based on a pointer at the accessed location. In response to the access, the access sensitive memory may be arranged to increment the pointer such that a subsequent access to the access sensitive memory will access a sequentially next data element. As a result, reissuing a memory access instruction targeting access sensitive memory may result in an incorrect data element being accessed. For these reasons, accesses to access sensitive memory may be performed non-speculatively. In general it may not be known whether an access is to access sensitive memory or not at the point of generation of reorder buffer entries. Rather, such accesses may be identified during execution at which point the memory access instruction may already be encoded within a compressed entry in the reorder buffer requiring a flush of that compressed entry which can reduce computational efficiency.

In view of the above discussion, in some configurations there is provided an apparatus comprising processing circuitry configured to process a sequence of instructions and a reorder buffer identifying a plurality of entries each identifying state information associated with execution of one or more instructions of the sequence of instructions. The apparatus is also provided with allocation circuitry configured to allocate entries in the reorder buffer based on the sequence of instructions. The allocation circuitry is configured to apply compression to the sequence of instructions to allocate at least one compressed entry corresponding to a plurality of instructions of the sequence of instructions. The apparatus is also provided with memory access circuitry responsive to a determination that an address associated with a memory access instruction corresponds to access-sensitive memory and that the memory access instruction corresponds to the compressed entry, to trigger a reallocation procedure comprising flushing the memory access instruction from the processing circuitry and triggering the allocation circuitry to reallocate the memory access instruction without applying the compression. The allocation circuitry is responsive to a determination that a frequency of occurrence of memory access instructions addressing the access-sensitive memory meets a predetermined condition, to suppress the compression whilst the predetermined condition is met.

The memory access circuitry is arranged to identify a memory location that is targeted by a memory access instruction and to determine if that memory location corresponds to access-sensitive memory. When it is determined that the memory access is to access sensitive memory and that the memory access instruction forms part of a compressed entry in the reorder buffer, the memory access circuitry is configured to flush the memory access instruction without attempting to access the access-sensitive memory. As a result, the pointer within the access sensitive memory that indicates which data element is to be read will not be updated and, when the memory access instruction is eventually executed, will access the correct memory location.

The inventors of the present techniques have realised that there are typical use cases in which memory access instructions that target access sensitive memory occur in groups with numerous memory access instructions to access sensitive memory occurring close to one another. When this occurs, the memory access circuitry could trigger the reallocation procedure frequently, resulting in numerous flushes and replays of instructions. This approach reduces the rate of instruction throughput of the apparatus reducing overall efficiency. By tracking a frequency of occurrence of memory access instructions that address access sensitive memory, the apparatus is able to identify such situations and is able to respond by suppressing compression of entries to reduce the likelihood that a further compressed entry will comprise a memory access instruction to the access sensitive memory.

The suppression of the compression is dependent on the frequency of occurrence of memory access instructions that are targeting the access sensitive memory and is applied whilst the frequency of occurrence meets the predetermined condition. As a result, when the frequency of occurrence of memory access instructions that are targeting the access sensitive memory reduces, the compression may be re-enabled.

The reorder buffer and the various circuitry elements described in the claim may be provided as physically discrete circuits that are interconnected to pass control signals and information between one another. Alternatively, the reorder buffer and the circuitry elements may be implemented as one or more combined circuits that provide the function of the reorder buffer and the circuitry elements.

Whilst in some configurations, the memory access circuitry may trigger the reallocation procedure in response to any determination that the address associated with a memory access instruction corresponds to access-sensitive memory and that the memory access instruction corresponds to the compressed entry, in some configurations the memory access circuitry is responsive to an indication that the memory access operation is a youngest instruction corresponding to the compressed entry, to suppress the reallocation procedure. When the memory access instruction is the youngest instruction to be executed within a compressed entry there are no younger instructions in that compressed entry that could potentially cause an exception. As a result, the compressed entry need not be reallocated and the memory access instruction can be issued non-speculatively. Suppressing the reallocation procedure in these cases reduces the total number of reallocation procedures and the total number of flushes that are required.

In some configurations the allocation circuitry is configured to determine the frequency of occurrence by counting a number of memory access instructions addressing the access-sensitive memory that occur within a predetermined number of entries of the reorder buffer. In some configurations, the frequency (i.e. a rate at which memory access instructions addressing the access-sensitive memory occur) can be estimated by providing a counter that counts the number of reorder buffer entries that are committed. By resetting the counter when a memory access instruction addressing the access sensitive memory is detected, it can be estimated whether the frequency is above or below a threshold frequency by determining whether the counter exceeds the predetermined number of entries. In some alternative configurations, the frequency of occurrences is determined by counting a number of memory access instructions addressing the access-sensitive memory that occur within a predetermined number of instructions or a predetermined number of instruction cycles.

In some configurations the allocation circuitry is configured, when counting the number of memory access instructions, to exclude memory access instructions addressing the access-sensitive memory that are not comprised in compressed entries. When an access-sensitive memory instruction is in a reorder buffer entry that is not compressed, there is no requirement to trigger the reallocation process. Therefore, when determining the frequency of occurrence of memory access instructions addressing the access-sensitive memory, the allocation circuitry may be configured to exclude such entries. This approach reduces the likelihood that the compression will be unnecessarily suppressed and increases the overall efficiency of the reorder buffer allocation.

In determining the frequency of occurrence, any number of entries of the reorder buffer can be used. In some configurations the reorder buffer is a circular buffer, and the predetermined number of entries comprises the total number of entries in the circular buffer. This approach allows for a relatively compact implementation in which a pointer can be stored indicating a location of the reorder buffer at which an occurrence of a memory access instruction accessing the access-sensitive memory. The allocation circuitry can therefore determine the frequency by counting occurrences of further memory access instructions accessing the access-sensitive memory before a head pointer of the reorder buffer (indicating a next entry of the reorder buffer that is to be committed) wraps around to the location indicated by the pointer.

In some configurations the predetermined condition is met when the number of memory access instructions addressing the access-sensitive memory exceeds a threshold. In some configurations, the threshold may be a single memory access instruction to access sensitive memory within the predetermined number of entries. In alternative configurations, the threshold may require multiple memory access instructions to access sensitive memory within the predetermined number of entries. In such configurations, a first access to the access sensitive memory may trigger a counter that counts the number of memory access instructions to access sensitive memory that occur within a sliding window which is defined in terms of the predetermined number of entries.

Whilst a same condition may be used to indicate when compression is to be suppressed, in some configurations and when the compression is suppressed, the allocation circuitry is responsive to the number of memory access instructions addressing the access-sensitive memory meeting a further predetermined condition, to resume the compression. The further predetermined condition may be the complement of the predetermined condition (i.e., the predetermined condition is met when the further predetermined condition is not met and the predetermined condition is not met when the further predetermined condition is met). In alternative configurations, the further predetermined condition may be different to the complement of the predetermined condition. In some configurations, the predetermined condition is met when a number of memory access instructions that are contained within a compressed entry of the reorder buffer and that access the access sensitive memory meet a threshold. The further predetermined condition may be based on any memory access instructions (comprised in compressed or uncompressed entries of the reorder buffer) that attempt to access the access-sensitive memory. By providing separate conditions for suppressing and resuming compression, an apparatus can be provided that avoids triggering the suppression due to uncompressed memory access instructions (for which it would not be necessary to flush and re-issue). Naturally, when the compression is suppressed, the number of compressed entries that comprise a memory access instruction to access sensitive memory will be reduced. Therefore, by providing a different predetermined condition (the further predetermined condition) for resuming compression, the allocation circuitry can be prevented from resuming compression whilst there is still a high frequency of memory access instructions that target the access sensitive memory.

Whilst in some configurations a small number of compressed entries targeting the access sensitive memory may be considered acceptable, in some configurations the further predetermined condition is met when no occurrences of memory access instructions addressing the access-sensitive memory are identified in the predetermined number of entries. This provides for a compact implementation in which the further predetermined condition can be implemented by having a single pointer that indicates a location in the reorder buffer of a most recently observed memory access to an access-sensitive memory. This single pointer can be updated in response to the detection of a further memory access to access sensitive memory. It can then be determined whether the further predetermined condition is met through a comparison between the single pointer and the commit pointer of the reorder buffer.

In some configurations the allocation circuitry is configured to determine that the predetermined condition is met in response to identification of two or more compressed memory access instructions addressing the access-sensitive memory occurring in the predetermined number of entries. This provides for a compact implementation in which the predetermined condition can be implemented using a single pointer that indicates a location in the reorder buffer of a most recently observed compressed entry comprising a memory access to an access-sensitive memory. This single pointer can be updated in response to the detection of a further compressed entry comprising a memory access to access sensitive memory. It can then be determined whether the predetermined condition is met through a comparison between the single pointer and the commit pointer of the reorder buffer. In some configurations, the same pointer storage can be used when compression is enabled for the single pointer determining whether the predetermined condition is met, and when compression is suppressed for the single pointer determining whether the further predetermined condition is met.

In some configurations the allocation circuitry is responsive to a given type of memory access instruction to suppress the compression when allocating the given type of memory access instruction. There may be certain types of memory access instructions where it can be determined, for example, by the decode circuitry, and before the location that the memory access instruction will access has been resolved, that the memory access instruction is of a given type that is known to be typically used for accessing access-sensitive memory. In such configurations, the allocation circuitry may be arranged to suppress compression for that instruction. Such an approach may result in fewer flushes and higher efficiency.

In some configurations each instruction is a micro-operation decoded from an architectural instruction of an instruction set architecture. An instruction set architecture comprises a set of instructions that can be interpreted by decoder circuitry of an apparatus. Instructions in the instruction set architecture therefore provide the means for a programmer or a compiler to control processing circuitry of the apparatus to perform predefined functions. Each instruction of the instruction set architecture may be decoded, by the decoder circuitry, into one or more micro-operations which may be issued to the processing circuitry out-of-order and tracked through a compressed or uncompressed entry in the reorder buffer.

In some configurations the predetermined condition is a software configurable condition. For example, the software configurable condition may define a threshold frequency at which compression is suppressed. In other configurations the predetermined condition may be hardwired into the allocation circuitry, the reorder buffer, the processing circuitry, or the memory access circuitry.

In some configurations the reallocation procedure comprises flushing each of the plurality of instructions younger than the memory access instruction and stalling reallocation of the memory access instruction until each of the plurality of instructions older than the memory access instruction have completed. This approach results in the memory access instruction being executed in-order thereby ensuring that any faults or exceptions that occur subsequent to execution of the memory access instruction do not require the memory access instruction to be flushed and re-issued.

In some configurations applying compression to the sequence of instructions comprises storing single state information indicative of a state of execution associated with all instructions comprised in the compressed entry. The format in which the state information is stored may vary. In some configurations, the state information associated with an oldest instruction of the instructions comprised in the compressed entry may be stored in its entirety with subsequent instructions storing only state information that differs from the state information associated with the oldest instruction. Alternative formats for the compression of entries would be readily apparent to the skilled person.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, System Verilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Particular configurations will now be described with reference to the figures.

FIG. 1 schematically illustrates an apparatus 10 according to various configurations of the present techniques. The apparatus 10 is provided with processing circuitry 12, allocation circuitry 14, a reorder buffer 16, and memory access circuitry 18. The processing circuitry 12 may comprise a processing pipeline (or parts of a processing pipeline) arranged to perform processing operations according to a sequence of instructions. The sequence of instructions is a sequence of micro-operations that have been generated, for example, using decoder circuitry (not illustrated) from a sequence of instructions that are comprised in an instruction set architecture. The allocation circuitry 14 is arranged to allocate the sequence of instructions to one or more entries 20 in the reorder buffer 16. The entries 20 may correspond to a single instruction, for example entry 20(1), entry 20(2), entry 20(3), and so on up to entry 20(N). In addition, the allocation circuitry 14 is arranged to allocate at least one compressed entry 20(4) corresponding to a plurality of instructions of the sequence of instructions. The entries 20 of the reorder buffer 16 comprise state information associated with execution of instructions of the sequence of instructions associated with that entry 20. The memory access circuitry 18 is arranged to access memory in response to memory access instructions (e.g., load instructions and store instructions). The memory access circuitry 18 is configured to determine whether a memory address associated with the memory access instruction, i.e., an address from which data is to be loaded or to which data is to be stored, corresponds to a location in access sensitive memory. If it is determined that the address corresponds to a location that is not in access sensitive memory, then the memory access circuitry 18 is arranged to perform the memory access as usual. If it is determined that the address corresponds to a location in access sensitive memory, then the memory access circuitry is arranged to determine if the memory access instruction is part of the at least one compressed entry 20(4). If so, then the memory access circuitry is arranged to trigger a reallocation procedure that comprises flushing the memory access instruction from the processing circuitry 12 and triggering the allocation circuitry 14 to reallocate the memory access instruction without applying the compression. The allocation circuitry 14 is arranged to maintain a frequency of occurrence of memory access instructions that have addresses corresponding to access sensitive memory and to determine whether the frequency meets a predetermined condition. When the allocation circuitry 14 determines that the predetermined condition is met, the allocation circuitry 14 suppresses compression whilst the predetermined condition is met.

Figure 2:
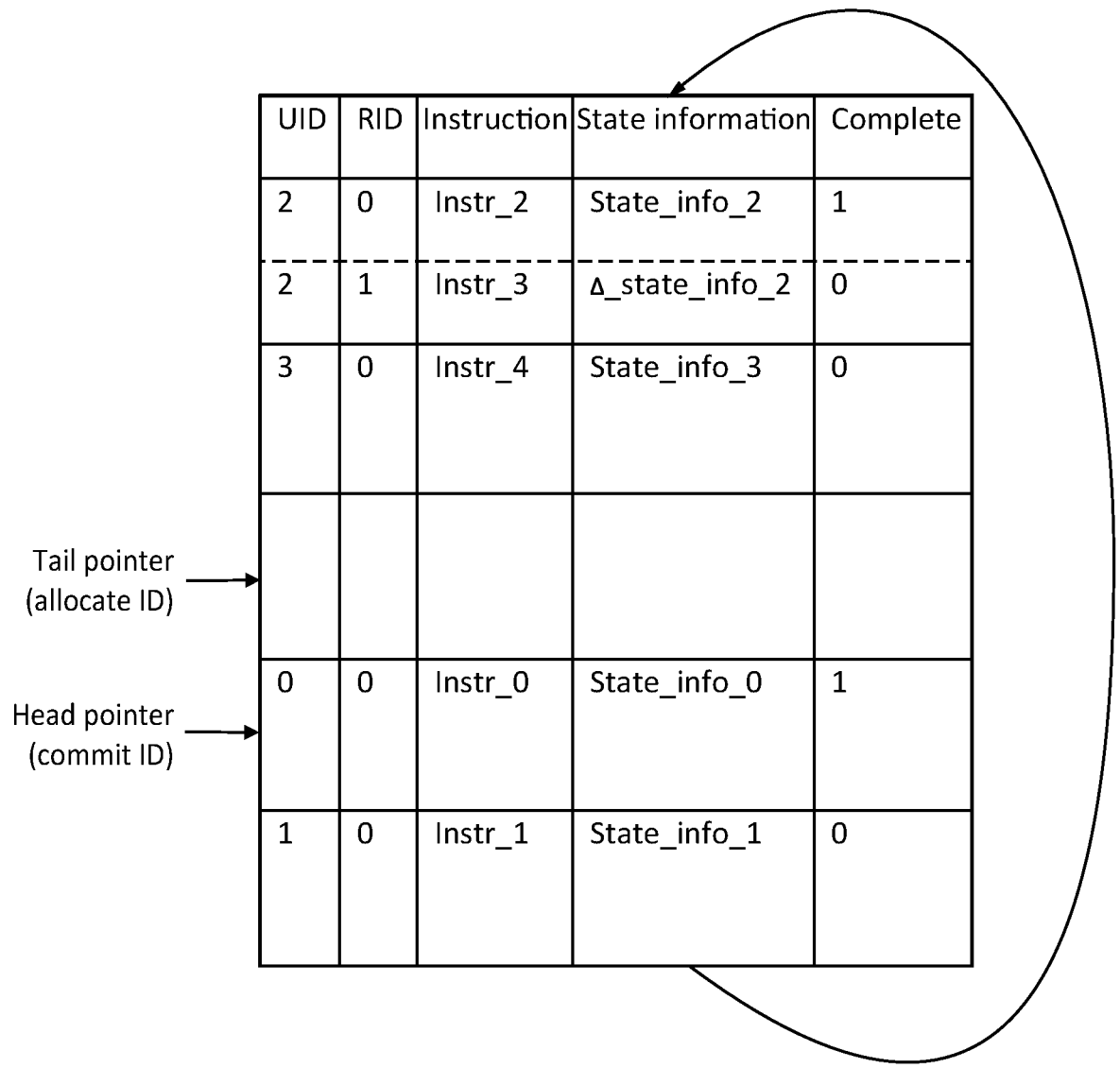
FIG. 2 schematically illustrates a reorder buffer according to various examples of the present techniques.

FIG. 2 schematically illustrates further details of entries of the reorder buffer 16 according to some examples of the present techniques. The reorder buffer 16 is a circular buffer that tracks a unique identifier (UID) for each entry or compressed entry in the reorder buffer. In the illustrated example, UID 0 corresponds to an uncompressed entry associated with instruction Instr_0; UID 1 corresponds to an uncompressed entry associated with Instr_1; UID 2 corresponds to a compressed entry associated with two instructions Instr_2, having relative identifier (RID) 0, and Instr_3, having relative identifier 1; and UID 4 corresponds to an uncompressed entry associated with Instr_4.

The reorder buffer 16 stores state information in association with each entry and completion information indicating whether that entry is ready to commit. The state information may include, for example, the program counter value, exception state, floating point status information, register rename state information, and/or other miscellaneous state information. It would be readily apparent to the skilled person that the aforementioned examples of state information are intended for exemplary purpose only and that one or more of the examples of state information may be omitted and/or one or more further examples of state information may be included in the state information stored in the reorder buffer 16. The state information for the compressed entry (UID 2) is stored as a single set of state information associated with Instr_2 and incomplete state information (Δ_state_info_2) for Instr_3 which indicates only state information different from the state information associated with Instr_2. In the illustrated example, instructions Instr_0, corresponding to UID 0, and Instr_2, corresponding to UID 2 and RID 0, have completed and are able to commit once they reach the head of the reorder buffer 16 and, in the case of the compressed entry (UID 2), once all instructions in the compressed entry have completed.

The oldest and youngest entries in the reorder buffer 16 are tracked using a head pointer (commit ID) and a tail pointer (allocate ID) respectively. The head pointer indicates a next item for potential removal from the list when the completion information associated with that entry indicates that all instructions in that entry have completed. The tail pointer indicates a youngest entry in the reorder buffer 16 and is used to identify where new entries in the reorder buffer 16 are to be stored and to indicate, in combination with the head pointer, whether the reorder buffer is full. In the event of an instruction fault or exception, the fault or exception state information is stored in the state information associated with the entry of the reorder buffer 16 of the faulting/exceptional instruction. Once the faulting/exceptional instruction entry reaches the head of the reorder buffer, the faulting/exceptional instruction can be correctly handled based on the state information that has been committed in program counter order.

Figure 3:
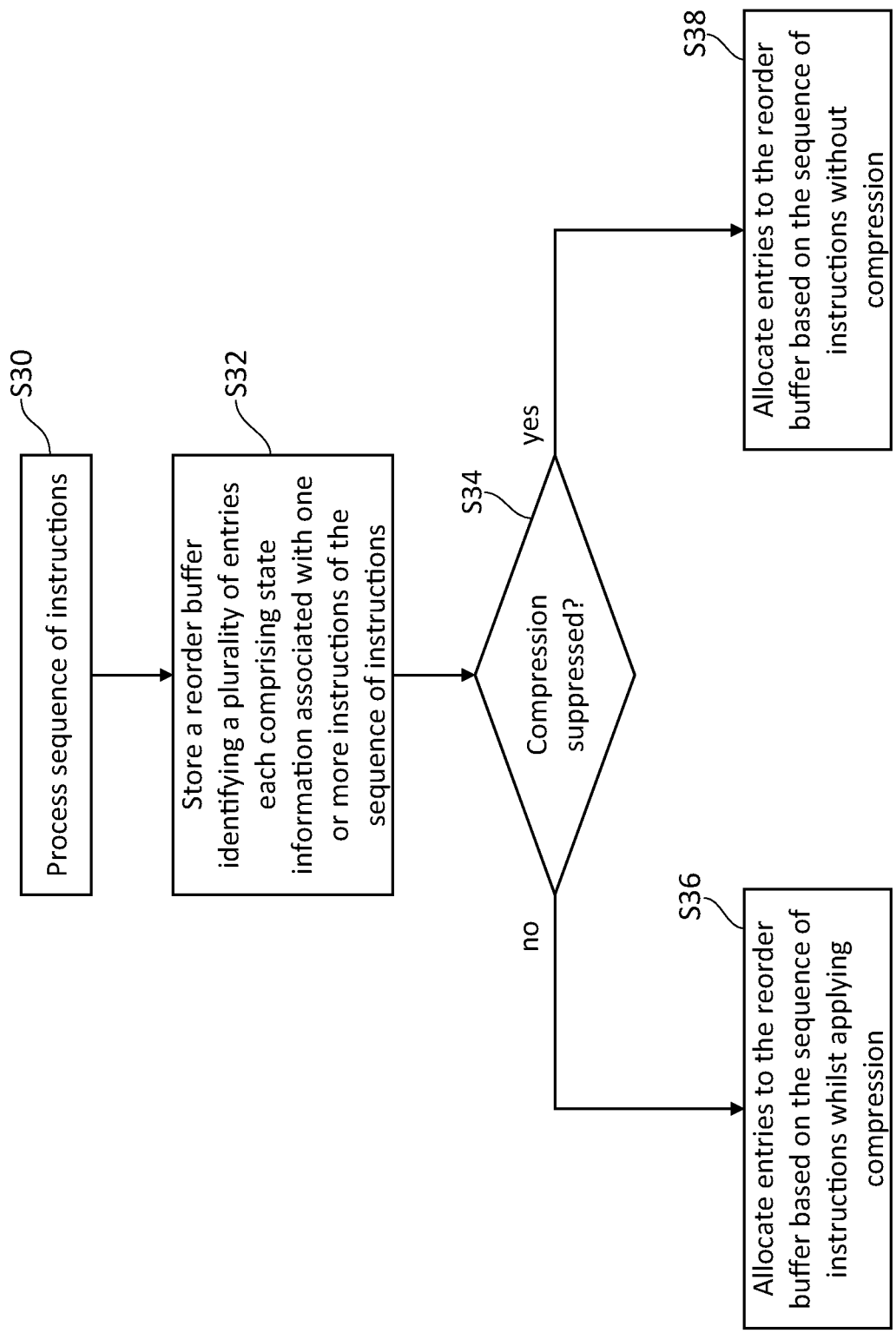
FIG. 3 schematically illustrates a sequence of steps carried out according to various examples of the present techniques.

FIG. 3 schematically illustrates a sequence of steps that are carried out by an apparatus 10 according to various configurations of the present techniques. Flow begins at step S30 where a sequence of instructions is processed by processing circuitry 12. Flow then proceeds to step S32 where a plurality of entries are stored in a reorder buffer 16.

Each of the entries in the reorder buffer 16 comprises state information associated with one or more of the sequence of instructions. Flow then proceeds to step S34 where it is determined if compression is suppressed. If, at step S34, it is determined that compression is not suppressed then flow proceeds to step S36 where allocation circuitry 14 allocates new entries to the reorder buffer 16 whilst, where appropriate, applying compression. If, at step S34, it was determined that compression is suppressed then flow proceeds to step S38 where the allocation circuitry 14 allocates new entries to the order buffer 16 without applying compression.

Figure 4:
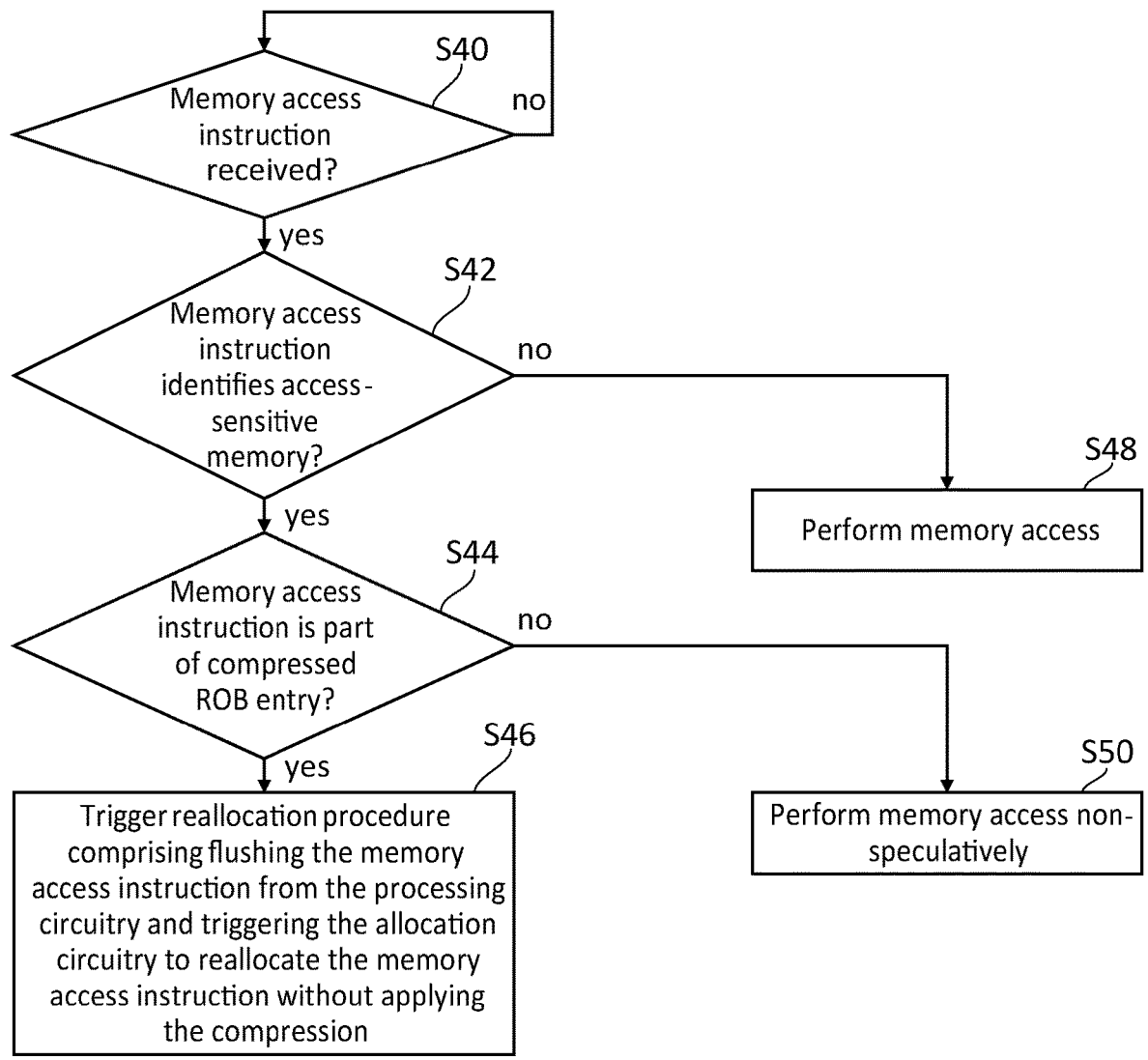
FIG. 4 schematically illustrates a sequence of steps carried out according to various examples of the present techniques.

FIG. 4 schematically illustrates a sequence of steps carried out by memory access circuitry 18 in accordance with various configurations of the present techniques. Flow begins at step S40 where it is determined whether or not a memory access instruction has been received. If, at step S40, it is determined that no memory access instruction has been received then flow remains at step S40. If, at step S40, it is determined that a memory access instruction has been received then flow proceeds to step S42. At step S42 it is determined whether or not the received memory access instruction identifies access sensitive memory. If, at step S42, it is determined that the memory access is not to access sensitive memory then flow proceeds to step S48 where the memory access is performed (either speculatively or non-speculatively). If, at step S42, it is determined that the memory access instruction identifies access sensitive memory, then flow proceeds to step S44 where it is determined whether the memory access instruction is part of a compressed entry of the reorder buffer 16. If, at step S44, it is determined that the memory access instruction is not part of a compressed entry of the reorder buffer 16 then flow proceeds to step S50 where the memory access is performed non-speculatively. If, at step S44, it is determined that the memory access instruction is part of a compressed entry then flow proceeds to step S46. At step S46, the memory access circuitry 18 triggers a reallocation procedure comprising flushing the memory access instruction from the processing circuitry and triggering the allocation circuitry to reallocate the memory access instruction without applying compression.

Figure 5:
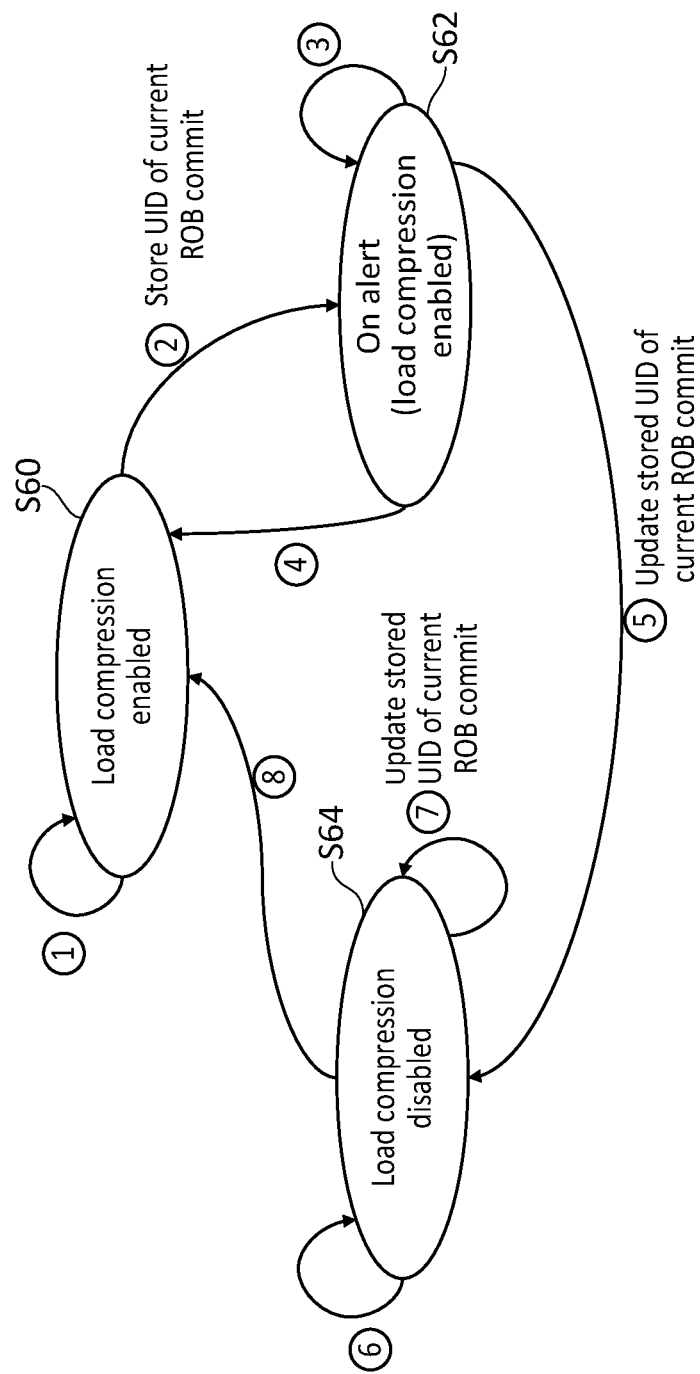
FIG. 5 schematically illustrates a sequence of steps carried out according to various examples of the present techniques.

FIG. 5 schematically illustrates a state diagram illustrating the behaviour of the allocation circuitry 14 in accordance with various configurations of the present techniques. The allocation circuitry 14 is configured to operate in a plurality of states comprising a load compression enabled state S60, an on alert with load compression enabled state S62, and a load compression disabled state S64.

In FIG. 5, numbered paths are shown (numbers in circles) which represent:
1. Memory accesses to memory that is not access-sensitive
2. Compressed memory access to access-sensitive memory
3. Memory accesses to memory that is not access-sensitive and current ROB commit not equal to the stored UID
4. Current ROB commit equal to the stored UID
5. Compressed memory access to access-sensitive memory
6. Memory accesses to memory that is not access-sensitive and current ROB commit not equal to the stored UID
7. Memory access to access-sensitive memory
8. Current ROB commit equal to the stored UID When operating in the load compression enabled state S60, the allocation circuitry remains in that state until a memory access to access-sensitive memory that is associated with a compressed entry in the reorder buffer 16 is received (path 2). Memory accesses to non-access-sensitive memory (path 1) do not cause the allocation circuitry to change to a different state. On detection of a memory access to access-sensitive memory that is associated with a compressed entry in the reorder buffer 16, the allocation circuitry store the unique identifier (UID) of the current head pointer (commit ID) of the reorder buffer 16 (ROB) and transitions (path 2) to the on alert state in which load compression is enabled S62.

When operating in the on alert state S62, the allocation circuitry tracks whether any further memory accesses to access-sensitive memory are received that are associated with compressed entries in the reorder buffer 16 (path 5). The allocation circuitry 14 also tracks the current head pointer (commit ID) of the reorder buffer 16. The allocation circuitry 14 remains in the on alert state S62 in response to memory access to memory that is not access sensitive (path 3) so long as the current head pointer of the reorder buffer 16 is not equal to the stored UID. When operating in the on alert state S62, the allocation circuitry 16 is responsive the current head pointer becoming equal to the stored UID (indicating a complete traversal of the circular reorder buffer) to transition to the load compression enabled state (path 4). If a further memory access to access-sensitive memory is received whilst the allocation circuitry 14 is operating in the on alert state S52 then the allocation circuitry 14 updates the stored UID to the current head pointer (commit ID) of the reorder buffer 16 and transitions (path 5) to the load compression disabled state S64.

When operating in the load compression disabled state S64, the allocation circuitry 14 allocates entries to the reorder buffer 16 without applying any compression (each micro-operation is associated with a different entry of the reorder buffer 16). The allocation circuitry 14 remains in the load compression disabled state S64 in response to memory accesses that are to non-access-sensitive memory whilst the current head pointer of the reorder buffer 16 is not equal to the stored UID (path 6). The allocation circuitry also remains in the load compression disabled state S64 in response to memory accesses to access-sensitive memory (path 7). In addition, when an access is made to access-sensitive memory whilst in the load compression disabled state, the stored UID is updated to the current head pointer (commit ID) of the reorder buffer 16. The allocation circuitry 14 transitions out of the load compression disabled state S64 back to the load compression enabled state S60 (path 8) when it is determined that the current head pointer (commit ID) of the reorder buffer 16 is equal to the stored UID (indicating a complete traversal of the circular reorder buffer since the last storage of the head pointer).

It would be readily apparent to the skilled person that the state diagram is an exemplary state diagram and that various modifications could be made to the state diagram. For example, in some alternative configurations, the state transitions from the on alert state S62 to the load compression enabled state S60 and/or from the load compression disabled state S64 to the load compression enabled state S60 may require multiple traversals of the reorder buffer or an incomplete number of traversals of the reorder buffer, e.g., by counting a number of entries between the current head pointer and the stored UID. In some alternative configurations the transition from the load compression enabled state S60 to the on alert state S62 (path 2) may occur for any memory access to access-sensitive memory (associated with a compressed or uncompressed memory access).

Figure 6:
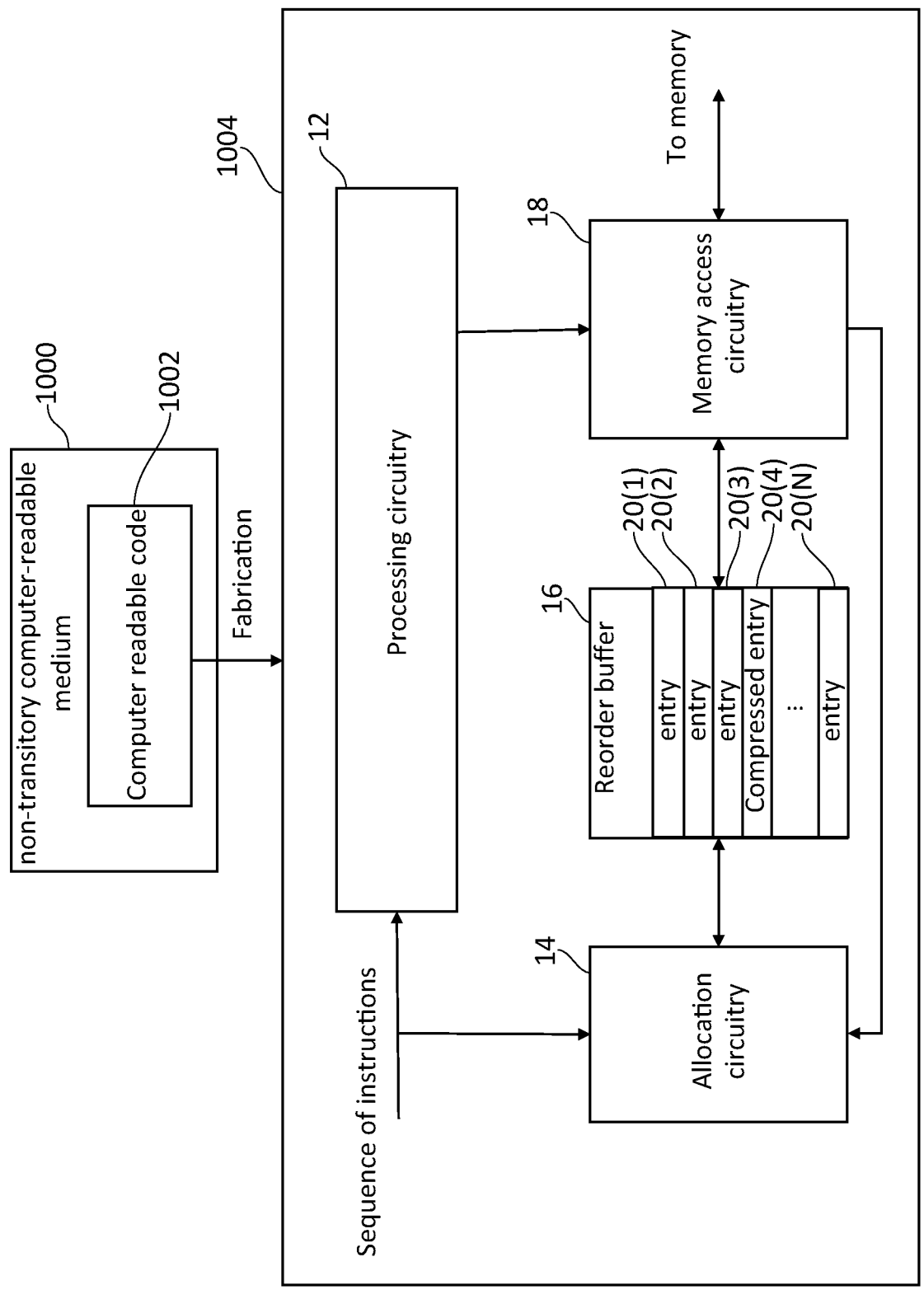
FIG. 6 schematically illustrates a non-transitory computer readable storage medium to store computer-readable code for fabrication of an apparatus according to various configurations of the present techniques.

FIG. 6 schematically illustrates a non-transitory computer-readable medium comprising computer readable code for fabrication of an apparatus according to various configurations of the present techniques. Fabrication is carried out based on computer readable code 1002 that is stored on a non-transitory computer-readable medium 1000. The computer-readable code can be used at one or more stages of a semiconductor design and fabrication process, including an electronic design automation (EDA) stage, to fabricate an integrated circuit comprising the apparatus embodying the concepts. The fabrication process involves the application of the computer readable code 1002 either directly into one or more programmable hardware units such as a field programmable gate array (FPGA) to configure the FPGA to embody the configurations described hereinabove or to facilitate the fabrication of an apparatus implemented as one or more integrated circuits or otherwise that embody the configurations described hereinabove. The fabricated design 1004 may in one example implementation comprise the processing circuitry 12, the allocation circuitry 14, the reorder buffer 16, and the memory access circuitry as described in relation to FIG. 1 and may be arranged to carry out any of the processes described in relation to FIGS. 3 to 5.

In brief overall summary there is provided an apparatus, method and medium. The apparatus comprises processing circuitry to process instructions and a reorder buffer identifying a plurality of entries having state information associated with execution of one or more of the instructions. The apparatus comprises allocation circuitry to allocate entries in the reorder buffer, and to allocate at least one compressed entry corresponding to a plurality of the instructions. The apparatus comprises memory access circuitry responsive to an address associated with a memory access instruction corresponding to access-sensitive memory and the memory access instruction corresponding to the compressed entry, to trigger a reallocation procedure comprising flushing the memory access instruction and triggering reallocation of the memory access instruction without the compression. The allocation circuitry is responsive to a frequency of occurrence of memory access instructions addressing the access-sensitive memory meeting a predetermined condition, to suppress the compression whilst the predetermined condition is met.

Some example configurations are set out in the following clauses:

Clause 1. An apparatus comprising:
  processing circuitry configured to process a sequence of instructions;
  a reorder buffer identifying a plurality of entries each identifying state information associated with execution of one or more instructions of the sequence of instructions;
  allocation circuitry configured to allocate entries in the reorder buffer based on the sequence of instructions, wherein the allocation circuitry is configured to apply compression to the sequence of instructions to allocate at least one compressed entry corresponding to a plurality of instructions of the sequence of instructions; and
  memory access circuitry responsive to a determination that an address associated with a memory access instruction corresponds to access-sensitive memory and that the memory access instruction corresponds to the compressed entry, to trigger a reallocation procedure comprising flushing the memory access instruction from the processing circuitry and triggering the allocation circuitry to reallocate the memory access instruction without applying the compression, wherein the allocation circuitry is responsive to a determination that a frequency of occurrence of memory access instructions addressing the access-sensitive memory meets a predetermined condition, to suppress the compression whilst the predetermined condition is met.

Clause 2. The apparatus of clause 1, wherein the memory access circuitry is responsive to an indication that the memory access operation is a youngest instruction corresponding to the compressed entry, to suppress the reallocation procedure.

Clause 3. The apparatus of clause 1 or clause 2, wherein the allocation circuitry is configured to determine the frequency of occurrence by counting a number of memory access instructions addressing the access-sensitive memory that occur within a predetermined number of entries of the reorder buffer.

Clause 4. The apparatus of clause 3, wherein the allocation circuitry is configured, when counting the number of memory access instructions, to exclude memory access instructions addressing the access-sensitive memory that are not comprised in compressed entries.

Clause 5. The apparatus of clause 3 or clause 4, wherein the reorder buffer is a circular buffer, and the predetermined number of entries comprises the total number of entries in the circular buffer.

Clause 6. The apparatus of any of clauses 3-5, wherein the predetermined condition is met when the number of memory access instructions addressing the access-sensitive memory exceeds a threshold.

Clause 7. The apparatus of any of clauses 3-6, wherein when the compression is suppressed, the allocation circuitry is responsive to the number of memory access instructions addressing the access-sensitive memory meeting a further predetermined condition, to resume the compression.

Clause 8. The apparatus of clause 7, wherein the further predetermined condition is met when no occurrences of memory access instructions addressing the access-sensitive memory are identified in the predetermined number of entries.

Clause 9. The apparatus of any of clauses 3 to 8, wherein the allocation circuitry is configured to determine that the predetermined condition is met in response to identification of two or more compressed memory access instructions addressing the access-sensitive memory occurring in the predetermined number of entries.

Clause 10. The apparatus of any preceding clause, wherein the allocation circuitry is responsive to a given type of memory access instruction to suppress the compression when allocating the given type of memory access instruction.

Clause 11. The apparatus of any preceding clause, wherein each instruction is a micro-operation decoded from an architectural instruction of an instruction set architecture.

Clause 12. The apparatus of any preceding clause, wherein the predetermined condition is a software configurable condition.

Clause 13. The apparatus of any preceding clause, wherein the reallocation procedure comprises flushing each of the plurality of instructions younger than the memory access instruction and stalling reallocation of the memory access instruction until each of the plurality of instructions older than the memory access instruction have completed.

Clause 14. The apparatus of any preceding clause, wherein applying compression to the sequence of instructions comprises storing single state information indicative of a state of execution associated with all instructions comprised in the compressed entry.

Clause 15. A non-transitory computer readable storage medium to store computer-readable code for fabrication of the apparatus of any preceding clause.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination (without A), or A, B and C in combination.

Although illustrative configurations of the invention have been described in detail herein with reference to the accompanying drawings, it is to be understood that the invention is not limited to those precise configurations, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. An apparatus comprising:
   processing circuitry configured to process a sequence of instructions;
   a reorder buffer identifying a plurality of entries each identifying state information associated with execution of one or more instructions of the sequence of instructions;
   allocation circuitry configured to allocate entries in the reorder buffer based on the sequence of instructions, wherein the allocation circuitry is configured to apply compression to the sequence of instructions to allocate at least one compressed entry corresponding to a plurality of instructions of the sequence of instructions; and
   memory access circuitry responsive to a determination that an address associated with a memory access instruction corresponds to access-sensitive memory and that the memory access instruction corresponds to the compressed entry, to trigger a reallocation procedure comprising flushing the memory access instruction from the processing circuitry and triggering the allocation circuitry to reallocate the memory access instruction without applying the compression,
   wherein the allocation circuitry is responsive to a determination that a frequency of occurrence of memory access instructions addressing the access-sensitive memory meets a predetermined condition, to suppress the compression whilst the predetermined condition is met.

2. The apparatus of claim 1, wherein the memory access circuitry is responsive to an indication that the memory access operation is a youngest instruction corresponding to the compressed entry, to suppress the reallocation procedure.

3. The apparatus of claim 1, wherein the allocation circuitry is configured to determine the frequency of occurrence by counting a number of memory access instructions addressing the access-sensitive memory that occur within a predetermined number of entries of the reorder buffer.

4. The apparatus of claim 3, wherein the allocation circuitry is configured, when counting the number of memory access instructions, to exclude memory access instructions addressing the access-sensitive memory that are not comprised in compressed entries.

5. The apparatus of claim 3, wherein the reorder buffer is a circular buffer, and the predetermined number of entries comprises the total number of entries in the circular buffer.

6. The apparatus of claim 3, wherein the predetermined condition is met when the number of memory access instructions addressing the access-sensitive memory exceeds a threshold.

7. The apparatus of claim 3, wherein when the compression is suppressed, the allocation circuitry is responsive to the number of memory access instructions addressing the access-sensitive memory meeting a further predetermined condition, to resume the compression.

8. The apparatus of claim 7, wherein the further predetermined condition is met when no occurrences of memory access instructions addressing the access-sensitive memory are identified in the predetermined number of entries.

9. The apparatus of claim 3, wherein the allocation circuitry is configured to determine that the predetermined condition is met in response to identification of two or more compressed memory access instructions addressing the access-sensitive memory occurring in the predetermined number of entries.

10. The apparatus of claim 1, wherein the allocation circuitry is responsive to a given type of memory access instruction to suppress the compression when allocating the given type of memory access instruction.

11. The apparatus of claim 1, wherein each instruction is a micro-operation decoded from an architectural instruction of an instruction set architecture.

12. The apparatus of claim 1, wherein the predetermined condition is a software configurable condition.

13. The apparatus of claim 1, wherein the reallocation procedure comprises flushing each of the plurality of instructions younger than the memory access instruction and stalling reallocation of the memory access instruction until each of the plurality of instructions older than the memory access instruction have completed.

14. The apparatus of claim 1, wherein applying compression to the sequence of instructions comprises storing single state information indicative of a state of execution associated with all instructions comprised in the compressed entry.

15. A method of operating an apparatus, the method comprising:
   processing a sequence of instructions;
   identifying, in a reorder buffer, a plurality of entries each identifying state information associated with execution of one or more instructions of the sequence of instructions;

allocating entries in the reorder buffer based on the sequence of instructions, wherein the allocation comprises applying compression to the sequence of instructions to allocate at least one compressed entry corresponding to a plurality of instructions of the sequence of instructions;

in response to a determination that an address associated with a memory access instruction corresponds to access-sensitive memory and that the memory access instruction corresponds to the compressed entry, triggering a reallocation procedure comprising flushing the memory access instruction from the processing circuitry and triggering the allocation circuitry to reallocate the memory access instruction without applying the compression; and in response to a determination that a frequency of occurrence of memory access instructions addressing the access-sensitive memory meets a predetermined condition, suppressing the compression whilst the predetermined condition is met.

16. A non-transitory computer readable storage medium to store computer-readable code for fabrication of an apparatus comprising:

processing circuitry configured to process a sequence of instructions;

reorder buffer identifying a plurality of entries each identifying state information associated with execution of one or more instructions of the sequence of instructions;

allocation circuitry configured to allocate entries in the reorder buffer based on the sequence of instructions, wherein the allocation circuitry is configured to apply compression to the sequence of instructions to allocate at least one compressed entry corresponding to a plurality of instructions of the sequence of instructions; and memory access circuitry responsive to a determination that an address associated with a memory access instruction corresponds to access-sensitive memory and that the memory access instruction corresponds to the compressed entry, to trigger a reallocation procedure comprising flushing the memory access instruction from the processing circuitry and triggering the allocation circuitry to reallocate the memory access instruction without applying the compression, wherein the allocation circuitry is responsive to a determination that a frequency of occurrence of memory access instructions addressing the access-sensitive memory meets a predetermined condition, to suppress the compression whilst the predetermined condition is met.

* * * * *